(12) United States Patent
Alric et al.

(10) Patent No.: US 9,796,837 B2
(45) Date of Patent: Oct. 24, 2017

(54) POLYETHYLENE COMPOUNDS HAVING NON-MIGRATORY SLIP PROPERTIES

(71) Applicant: PolyOne Corporation, Avon Lake, OH (US)

(72) Inventors: Jerome Alric, Champagne sur Oise (FR); Jerome Waeler, Saint Martin le Noeud (FR); Fabien Auvray, Pontoise (FR)

(73) Assignee: PolyOne Corporation, Avon Lake, OH (US)

( * ) Notice: Subject to any disclaimer, the term of this patent is extended or adjusted under 35 U.S.C. 154(b) by 418 days.

(21) Appl. No.: 14/414,584

(22) PCT Filed: Jul. 15, 2013

(86) PCT No.: PCT/US2013/050537
§ 371 (c)(1),
(2) Date: Jan. 13, 2015

(87) PCT Pub. No.: WO2014/014833
PCT Pub. Date: Jan. 23, 2014

(65) Prior Publication Data
US 2015/0203643 A1    Jul. 23, 2015

Related U.S. Application Data

(60) Provisional application No. 61/672,150, filed on Jul. 16, 2012.

(51) Int. Cl.
| | |
|---|---|
| C08L 23/06 | (2006.01) |
| B32B 27/32 | (2006.01) |
| B32B 27/28 | (2006.01) |
| C08J 3/22 | (2006.01) |
| C08L 83/06 | (2006.01) |
| C08L 83/08 | (2006.01) |
| C08L 23/08 | (2006.01) |
| B32B 27/06 | (2006.01) |
| C08J 5/18 | (2006.01) |
| C08G 77/14 | (2006.01) |
| C08G 77/18 | (2006.01) |
| C08G 77/26 | (2006.01) |

(52) U.S. Cl.
CPC .............. *C08L 23/06* (2013.01); *B32B 27/06* (2013.01); *B32B 27/283* (2013.01); *B32B 27/32* (2013.01); *C08J 3/226* (2013.01); *C08L 23/0815* (2013.01); *C08L 83/06* (2013.01); *C08L 83/08* (2013.01); *B32B 2250/02* (2013.01); *B32B 2307/746* (2013.01); *C08G 77/14* (2013.01); *C08G 77/18* (2013.01); *C08G 77/26* (2013.01); *C08J 5/18* (2013.01); *C08J 2323/06* (2013.01); *C08J 2423/06* (2013.01); *C08J 2423/08* (2013.01); *C08J 2435/02* (2013.01); *C08J 2483/06* (2013.01); *C08J 2483/08* (2013.01); *C08L 2310/00* (2013.01); *Y10T 428/269* (2015.01)

(58) Field of Classification Search
CPC .......... C08L 23/06; C08L 23/12; C08L 35/00; C08L 83/04; C08L 83/06
USPC ................ 524/267, 268, 499, 502, 504, 515
See application file for complete search history.

(56) References Cited

U.S. PATENT DOCUMENTS

| | | | |
|---|---|---|---|
| 4,291,136 A | 9/1981 | Keogh | |
| 4,328,323 A | 5/1982 | Keogh | |
| 4,343,917 A | 8/1982 | Keogh | |
| 4,353,997 A | 10/1982 | Keogh | |
| 4,369,289 A | 1/1983 | Keogh | |
| 4,404,349 A | 9/1983 | Keogh | |
| 4,434,272 A | 2/1984 | Keogh | |
| 4,440,907 A | 4/1984 | Keogh | |
| 4,446,279 A | 5/1984 | Keogh | |
| 4,535,113 A | 8/1985 | Foster et al. | |
| 4,552,941 A | 11/1985 | Keogh | |
| 4,575,535 A | 3/1986 | Keogh | |
| 4,990,400 A | 2/1991 | Endo et al. | |
| 5,106,681 A | 4/1992 | Endo et al. | |
| 5,256,473 A | 10/1993 | Kotani et al. | |
| 5,318,833 A | 6/1994 | Fujimoto et al. | |
| 5,346,951 A * | 9/1994 | Suwada ............... | C08G 77/442 525/64 |
| 7,193,018 B2 | 3/2007 | Jacob et al. | |
| 7,790,795 B2 | 9/2010 | Schauder et al. | |
| 8,268,939 B2 | 9/2012 | Ebbrecht et al. | |
| 8,557,906 B2 | 10/2013 | Kerstetter, III | |
| 9,006,332 B2 | 4/2015 | Kerstetter, III et al. | |
| 2002/0146550 A1 * | 10/2002 | Hirai ....................... | C08L 69/00 428/220 |
| 2008/0027161 A1 | 1/2008 | Schlosser et al. | |
| 2013/0220667 A1 * | 8/2013 | Millan Perez .......... | C08L 23/08 174/120 SR |
| 2015/0203673 A1 | 7/2015 | Alric et al. | |

FOREIGN PATENT DOCUMENTS

| | | |
|---|---|---|
| EP | 0 484 093 B1 | 3/1996 |
| EP | 3050911 A1 * | 8/2016 |
| WO | 2010039376 A1 | 4/2010 |

* cited by examiner

*Primary Examiner* — Marc Zimmer
(74) *Attorney, Agent, or Firm* — John H. Hornickel

(57) ABSTRACT

A masterbatch having functionalized silicone with an epoxy group or a secondary amine group as a slip additive, the polyethylene compound that the silicone-containing masterbatch has been let down into, and the plastic articles and films from such compounds having improved slip properties are disclosed. The improved slip properties are evidenced by essentially no migration of the slip additive 12 weeks after manufacturing and a dynamic coefficient of friction value of less than 0.4 and a static coefficient of friction 0.5 or less as measured within the first day of manufacturing according to the ASTM D1894-01 method.

15 Claims, No Drawings

POLYETHYLENE COMPOUNDS HAVING NON-MIGRATORY SLIP PROPERTIES

CLAIM OF PRIORITY

This application claims priority from U.S. Provisional Patent Application Ser. No. 61/672,150 filed on Jul. 16, 2012, which is incorporated by reference.

FIELD OF THE INVENTION

This invention relates to masterbatches using functionalized silicone with an epoxy group or a secondary amine group as a slip additive, polymer compounds that these silicone-containing masterbatches have been let down into, and polyethylene articles produced from such compounds having improved slip properties compared to a non-reactive silicone slip additive and essentially no slip additive migration, as determined by measurements of the static and dynamic coefficients of friction (COF) values according to the ASTM D1894-01 method.

BACKGROUND OF THE INVENTION

Plastic has taken the place of other materials in a variety of industries. Because plastic can be engineered to not shatter, rust or rot, plastic articles have replaced glass, metal and wood articles in many applications. For example, in the food and packaging industries, plastic has replaced glass to minimize breakage, reduce weight, and reduce energy consumed in manufacturing and transport.

Additives are often added to a plastic to facilitate the processing of the polymer material. Commonly used additives are slip agents, which act as an internal lubricant for the polymer during processing. For instance in film processing, slip additives lessen friction between the polymer film and high speed processing and packaging equipment.

Slip additives often function by migrating (i.e. "blooming") to the surface of the polymer, where they provide a coating that reduces the surface's coefficient of friction. Because the additive is concentrated at the surface where it is needed for processing, less slip additive is required in the polymer material overall.

Typically variants of fatty acids are used as slip additives, because they are immiscible within, and chemically inert to, the polymer matrix, making them more likely to be migratory. For example, many commonly used slip additives, such as erucamide, oleamide, stearamide, behenamide, oleyl palmitamide, stearyl erucamide, ethylene bis-oleamide, N,N'-Ethylene Bis(Stearamide) (EBS), are highly migrant (i.e. migration occurs within hours of the film formation).

However, there is also loss of slip additive, due to additive migration or transfer from the polymer material. "Additive migration" represents the slip additive migrating from the sliding layer of the film containing slip additive, to another film layer. "Additive transfer" represents the slip additive transferring to another substrate (for example transferring to another section of the film when it is rolled). Therefore, films and other articles with migratory slip additives experience diminished slip properties over time or exposure to higher temperatures.

Consequently, if for example there is an interval before further processing, those polymer materials containing traditional migratory slip additives may require cold storage. Slip performance may also decrease when exposed to high processing temperatures. Finally, migratory slip additives are not suitable for applications that require consistent slip properties over the useful life of the article, such as for release films and permanent anti-slip coatings.

High molecular weight (HMW) non-reactive silicone gums have been found to migrate more slowly (over days versus hours). However, the trade off is reduced slip properties, represented by higher COF values, and limited long-term stability.

SUMMARY OF THE INVENTION

What the art needs is a slip additive for polyethylene-based compounds that is non-migratory, has improved slip properties compared to non-reactive silicone slip additives, and that exhibits good stability over time and exposure to heat.

In one embodiment of the invention is a masterbatch for polyethylene, comprising: (a) polyethylene carrier; (b) functionalized polysiloxane; (c) functionalized polyolefin; and (d) optionally, other additives. The functional group on the polysiloxane includes either an epoxy or secondary amine group. The functionalized polyolefin contains a maleic anhydride (MAH) group and acts as a grafting agent to react with the epoxy or secondary amine group on the polysiloxane.

In one embodiment of the invention the polyethylene compound of the masterbatch described above is let down into a polyethylene resin. Because the functionalized polyolefin is miscible with the polyethylene matrix, once the functionalized polyolefin has reacted with the polysiloxane, it immobilizes the polysiloxane in the polyethylene matrix.

Another embodiment of the invention is a plastic article produced from the polyethylene compound or directly from the masterbatch. The article may be shaped from injection molding, blown film extrusion, or calendered into sheets.

Another embodiment of the invention is a film produced from the polyethylene compound. The film may include other layers having the same or different ingredients forming a laminate. The laminate may be a coextruded multilayer structure. The laminate may have a core layer and a skin layer contacting the surface of the core layer.

In another aspect of the invention, the skin layer of the laminate has a dynamic COF value of 0.4 or less and a static COF value of 0.5 or less measured within 1 day after manufacturing, according to the ASTM D1894-01 method.

Another aspect of the invention is a laminate in which there is essentially no migration of the slip additive into another layer of the film 12 weeks after manufacturing.

The following embodiments explain some attributes of the invention.

EMBODIMENTS OF THE INVENTION

Polyethylene

Polyethylene is a versatile thermoplastic material used in a wide variety of applications because of its low cost and combination of excellent physical, mechanical, and thermal properties. For purposes of this invention, polyethylene is the polymer carrier for the masterbatch formulation and also serves as the matrix for the polymer compound forming the final plastic article. The polyethylene for the invention may be linear or branched, and may include high density polyethylenes (HDPEs) and low density polyethylenes (LDPEs). Preferred for this invention is LDPE, with a density range of about 0.910 to about 0.940 g/cm$^3$. LDPE has a high degree of branching, which results in it having a lower density. LDPE is used rigid containers and plastic film applications such as food wrap packaging and shopping bags.

There are numerous commercial manufacturers of polyethylene, including Dow Chemical, LyondellBasell, ExxonMobil and Sabic.

Polyorganosiloxane

Siloxanes can have branched or unbranched backbones consisting of alternating silicon and oxygen atoms —Si—O—Si—O—, with side chains R attached to the silicon atoms. Polymerized siloxanes with organic side chains are commonly known as silicones or as polysiloxanes, as represented generally by the structure below.

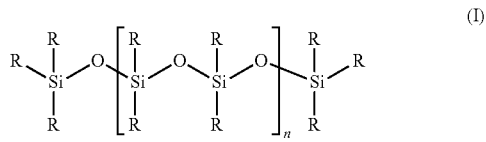
(I)

The organic side chains confer hydrophobic properties while the —Si—O—Si—O— backbone is purely inorganic. It is preferred for the invention that "n", the number of repeating Si—O groups in the molecule backbone, is an integer from 1 to 1500.

Polysiloxanes may be modified by a reactive functional group, such as a hydroxyl group, an alcohol group, a carboxyl group, an isocyanate group, a silanol group, a blocked polyisocyanate group, a primary amine group, a secondary amine group, an amide group, a carbamate group, a urea group, a urethane group, a vinyl group, an unsaturated ester group, a maleimide group, a fumarate group, an anhydride group, a hydroxy alkylamide group, or an epoxy group. The polysiloxanes for the invention include at least one epoxy group or secondary amine group.

Polysiloxanes are commercially available from a wide variety of manufacturers, including Dow Corning, Evonik, Wacker Chemical, ICM Products and UCT Specialties.

Functionalized Polyolefin

The functionalized polyolefin plays a key role for immobilizing the slip additive in the polyethylene matrix. For the present invention, the functionalized polyolefin contains a maleic anhydride group that is highly reactive with the epoxy or secondary amine group on the functionalized polysiloxane.

A reaction between an epoxy group on the polysiloxane and the maleic anhydride group on the functionalized polyolefin will form either an ester or ether linkage. The ester linkage is formed as a result of the anhydride ring opening into a monoester having a carboxylic group that will then react with the epoxy group on the polysiloxane. The ether linkage is formed by a reaction between the epoxy group on the polysiloxane and a hydroxyl group from the compound of the previously described ester-forming reaction or from the anhydride monoester. These ester-forming and ether-forming reactions with the epoxy group may exclude the use of a catalyst.

A reaction between a secondary amine group on the polysiloxane and the maleic anhydride group on the functionalized polyolefin will form an intermediate amic acid function, which cyclizes into an imide group above 200° C. This reaction can be catalyzed by a Lewis acid.

As a result of the polysiloxane forming a linkage to the functionalized polyolefin, the polysiloxane is consequently also anchored in the polyethylene matrix. Therefore, the more compatible the functionalized polyolefin is to the polyethylene, the better dispersed the slip additive will also be in the polyethylene matrix.

Functionalized polyolefins having a maleic anhydride group include Lotader 8200, an ethylene ethyl acrylate maleic anhydride terpolymer from Arkema.

Optional Additives

The polymer compounds of the present invention can include any conventional plastics additives in any combination that would not deleteriously affect the slip properties of the compound. The amount should not be wasteful of the additive or detrimental to the processing or performance of the compound. Those skilled in the art of thermoplastics compounding, without undue experimentation but with reference to such treatises as *Plastics Additives Database* (2004) from Plastics Design Library (www.elsevier.com), can select from many different types of additives for inclusion into the compounds of the present invention.

Non-limiting examples of optional additives include adhesion promoters; antioxidants; biocides (antibacterials, fungicides, and mildewcides), anti-fogging agents; anti-static agents; bonding, blowing and foaming agents; dispersants; fillers and extenders; smoke suppressants; expandable char formers; impact modifiers; initiators; lubricants; micas; pigments, colorants and dyes; plasticizers; processing aids; other polymers; release agents; silanes, titanates and zirconates; additional slip agents; anti-blocking agents; stabilizers; stearates; ultraviolet light absorbers; viscosity regulators; waxes; and combinations of them.

In particular, antiblock additives are often used together with slip additives and for their complementary functions. Anti-block additives reduce adhesion or the "stickiness" between polymer layers (usually layers of the same polymer), which is created by blocking forces inherent to many polymers. Whereas slip additives decrease friction caused from moving across the surface of a polymer, antiblock additives create a microrough surface that lessens the adhesion caused by these blocking forces. Antiblock additives, like slip additives, are commonly used to improve the handling of a polymer for applications such as packaging. Preferably for this invention a non migratory antiblock additive, such as crosslinked poly(methyl methacrylate) or inorganic silica, is used.

For convenience during processing and handling, the reactive silicone slip additive can be made into a masterbatch formulation, which is afterward let down into the polyethylene resin that is made into a film or other article. To have the highest concentration of slip additive, as required for example in release film applications, the masterbatch can also be processed into the film directly.

Table 1 shows the acceptable, desirable, and preferable ranges of ingredients for the masterbatch mixture. The masterbatch of the invention can comprise, consist essentially of, or consist of these ingredients in these amounts.

TABLE 1

Ranges of Ingredients for the Masterbatch Mixture

| Ingredient (Wt. Percent) | Acceptable | Desirable | Preferable |
|---|---|---|---|
| Polyethylene Carrier | 1%-99% | 40%-90% | 80%-90% |
| Functionalized polysiloxane | 0.1%-50% | 5%-10% | 5%-10% |
| Functionalized polyolefin | 1%-99.9% | 5%-40% | 5% |
| Optional additives | 0%-10% | 0%-10% | 0%-1% |

The masterbatch of the present invention may be added to the polyethylene compound in an amount resulting in from about 0.5% to about 50%, and preferably from about 2% to about 25%, percent weight of the polyethylene compound.

The polyethylene compound may include one or more masterbatches containing different additives beneficial for the final plastic article. If a high concentration of slip additive is required, the polyethylene compound may also have an overall weight percent of 50% or greater of the masterbatch. To minimize migration of excess silicone additive, the stoichiometry between the polysiloxane and functionalized polyolefin is preferably a ratio in which there is sufficient functionalized polyolefin to react with all of the polysiloxane in the masterbatch.

Processing

Masterbatch Production

The preparation of the masterbatches of the present invention is uncomplicated. The masterbatches of the present invention can be made in continuous or batch operations.

Mixing in a continuous process typically occurs in an extruder that is elevated to a temperature that is sufficient to melt the polymer matrix with addition either at the head of the extruder or downstream in the extruder of the solid or liquid ingredient additives. Specific melt mixing equipments suitable for the manufacture of the said masterbatch include single screw extruder, co-rotating or counter-rotating twin screw extruder, multiple screw extruder or co-kneader. Preferably the melt mixing equipment used is a twin screw co-rotating extruder equipped with screws having a length to diameter (L/D) ratio of at least 40. Extruder speeds can range from about 50 to about 500 revolutions per minute (rpm).

Processing conditions to be applied during mixing in a continuous process are dependent of the polymer carrier used. In the present case where the polymeric carrier is polyethylene, the processing temperatures are in the range of 140° C. to 240° C.

Typically, the output from the extruder is pelletized into standard size pellets, or may also be cut by an underwater pelletizer to create beads. The pellets or beads are used for later extrusion or molding into polymeric articles.

To ensure constant and homogeneous quality of the masterbatch, the ingredients are preferably dosed in a twin screw extruder with gravimetric dosing units. The polymer carrier is added in the extruder via the main hopper and additives are either added via the main hopper or are incorporated into the polymer via a side feeder.

Mixing in a batch process typically occurs in a Banbury mixer that is capable of operating at a temperature that is sufficient to melt the polymer matrix to permit addition of the solid or liquid ingredient additives. The mixing speeds range from 60 to 1000 rpm. The output from the mixer is chopped into smaller sizes for later extrusion or molding into polymeric articles.

Masterbatch concentrates can be later let down into a polymer resin composition to produce the polyethylene compound, which can be molded, extruded, or calendered into plastic articles.

Film Extrusion

Subsequent extrusion or molding techniques of the final compound of the present invention to form polymer films or other articles are well known to those skilled in the art of thermoplastics polymer engineering. Without undue experimentation but with such references as "Extrusion, The Definitive Processing Guide and Handbook" published by Plastics Design Library (www.elesevier.com), one can use different techniques for making articles using the compound of the present invention.

Polyethylene films may be formed, for example, from an extruded melt that is blown or cast or even cast and quenched, either onto a drum, a belt, in water, or the like. Cast films may be subsequently oriented, either uniaxially or biaxially, using conventional equipment such as drawing on heated rollers or using a tenter-frame, or combination thereof.

USEFULNESS OF THE INVENTION

The present invention may be used in numerous applications that would benefit from materials having stable slip properties. For example, the present invention may be desirable inside containers to promote the flow of the container's contents when pouring or mixing, but avoid possible contamination of the slip additive into the contents, such as food or medicine.

The present invention may also provide slip properties for higher temperature processing of films and other articles, including cast and biaxially-oriented films.

In addition, prolonged slip performance may be desirable in certain packaging applications, including packaging rolls, packaging bags, caps, pouches, sheets, trays, carton liners, wrappers, screen printing films, lamination film, labels, adhesives, stretch and shrink wraps, and photographic materials.

The present invention may also be useful in release film applications as an alternative to silicone coated polyolefin films, which require the costly step of curing the silicone coating on the polyolefin skin.

EXAMPLES

Table 2 shows a list of ingredient for the Comparative Examples A-D and Examples 1 and 2, including a description, brand name, manufacturer and function of each ingredient. Table 3 shows the recipes for Masterbatches (MBs) I-V.

TABLE 2

Description of Ingredients

| Name | Description | Brand | Manufacturer | Function |
|---|---|---|---|---|
| Polyethylene | Low density polyethylene | LDPE 100 | Exxon | Carrier and film matrix resin |
| Non-reactive silicone MB | High molecular weight silicone gum (10%), Polyethylene (90%) | Multibase diluted into LDPE | PolyOne | Slip additive |
| Alkoxysilane functionalized polysiloxane (reactive silicone) | Ethoxyl silyl terminated polydimethyl siloxane | 3-0247 ETE POLYMER | Dow Corning | Slip additive |
| Methoxy functionalized polysiloxane (reactive silicone) | Methoxy functional methyl polysiloxane | SILRES MSE-100 | Wacker | Slip additive |
| Epoxy functionalized polysiloxane (reactive silicone) | Epoxy functional polysiloxane | TEGOMER E-Si 2330 | Evonik | Slip additive |

TABLE 2-continued

Description of Ingredients

| Name | Description | Brand | Manufacturer | Function |
|---|---|---|---|---|
| Secondary amine functionalized polysiloxane (reactive silicone) | Secondary amine functional polysiloxane | TEGOMER A-Si 2330 | Evonik | Slip additive |
| Functionalized terpolymer of ethylene (2.8% MAH) | Ethylene ethyl acrylate maleic anhydride terpolymer (2.8% MAH) | LOTADER 8200 | Arkema | Grafting agent for the reactive silicone |
| Amino-functionalized silane | 3-Amino propyl trimethoxy silane | DYNASILAN AMEO | Evonik | Co-agent with the reactive silicone |
| Catalyst | Tetra n-butyl titanate | TYZOR T-nBT | Dorf Ketal Chemicals | Silanol catalyst |
| Antiblock MB | Polyethylene masterbatch of crosslinked poly(methyl methacrylate) beads | On Cap ABPE MB | PolyOne | Anti-block additive |

TABLE 3

Masterbatch Recipes

| Ingredient Name (by Wt. Percent) | MB I | MB II | MB III | MB IV | MB V |
|---|---|---|---|---|---|
| Polyethylene carrier | 90% | 89% | 88.5% | 90% | 90% |
| Alkoxysilane functionalized polysiloxane (reactive silicone) | 5% | 5% | | | |
| Methoxy silane functionalized methyl polysiloxane (reactive silicone) | | | 5% | | |
| Epoxy functionalized polysiloxane (reactive silicone) | | | | 5% | |
| Secondary amine functionalized polysiloxane (reactive silicone) | | | | | 5% |
| Functionalized terpolymer of ethylene (2.8% MAH) | 5% | 5% | 5% | 5% | 5% |
| Amino-functionalized silane | | | 0.5% | | |
| Catalyst | | 1% | 1% | | |
| | 100% | 100% | 100% | 100% | 100% |

Masterbatches I-V were prepared by a continuous process using a BERSTORFF ZE25A co-rotating twin screw extruder having a screw length to diameter ratio of 60. Table 4 shows the mixing conditions of the twin screw extruder.

TABLE 4

Extruder Mixing Conditions for Masterbatches I-V

| Extruder Type | ZE25A twin screw extruder, with a screw size of 25 mm L/D = 60 |
|---|---|
| Zone 1 | 20° C. |
| Zone 2 | 140° C. |
| Zone 3 | 200° C. |
| Zone 4 | 210° C. |
| Zone 5 | 220° C. - silicone injection |
| Zone 6 | 220° C. |
| Zone 7 | 220° C. |
| Zone 8 | 220° C. |
| Zone 9 | 230° C. |
| Zone 10 | 240° C. |
| Die Temperature | 240° C. |
| RPM | 500 |
| Pelletizer | Strand pelletizer |
| Pellet size | 3 mm |

All of the ingredients for the masterbatches were fed into the throat of the extruder, except the silicone slip additives. The silicone slip additives were injected into the melt in zone 5 via injection ports.

Pellets produced from the above described process were then blended into the polymer resin matrix to produce the polyethylene compound. Table 5 shows the recipes and Table 6 shows the film extrusion conditions for all the Comparative Examples and Examples.

TABLE 5

Recipes (Wt. %) of Comparative Examples and Examples

| Ingredient/ Masterbatch | Example | | | | | |
|---|---|---|---|---|---|---|
| | A | B | C | D | 1 | 2 |
| Polyethylene matrix | 79% | 79% | 79% | 79% | 79% | 79% |
| MB I | | 20% | | | | |
| MB II | | | 20% | | | |
| MB III | | | | 20% | | |
| MB IV | | | | | 20% | |
| MB V | | | | | | 20% |
| Non-reactive silicone MB | 20% | | | | | |
| Antiblock MB | 1% | 1% | 1% | 1% | 1% | 1% |
| Total | 100% | 100% | 100% | 100% | 100% | 100% |
| % Silicone | 1% | 1% | 1% | 1% | 1% | 1% |
| % Total functionalized polyolefin | 0% | 1% | 1% | 1% | 1% | 1% |

The polyethylene compounds were extruded into a 2-layer laminate film, overall A/B film thickness of 50 μm, of which the A side (slip layer) is 5 μm and the B side (virgin LDPE) is 45 μm, using a Labtech multilayer cast film line according to the conditions in Table 6, below.

TABLE 6

Film Extrusion Conditions of All Comparative Examples and Examples

| Extruder Type | Single screw extruder |
|---|---|
| Zone 1 | 180° C. |
| Zone 2 | 220° C. |
| Zone 3 | 220° C. |
| Zone 4 | 220° C. |
| Distributor | 220° C. |
| Head | 225° C./220° C./225° C. |
| Die | Slot die |
| RPM | Screw speed between 35 and 75 rpm to obtain thickness for film extrusion |
| Chill Roll | Chill roll at 20° C. and 6 m/min |

Evaluation of Polyethylene Films

Non-reactive silicone was compared to four types of reactive silicones for effectiveness as slip additives in polyethylene-based films. The reactive silicones evaluated were 1) alkoxysilane functionalized polysiloxane, 2) methoxy functionalized polysiloxane, 3) epoxy functionalized polysiloxane, and 4) secondary amine functional polysiloxane. The Example formulations satisfied the required and preferred criteria described in Table 7. The results of the Comparative Examples and Examples are shown in Table 8.

TABLE 7

Criteria and Testing Methods of Films

| Criteria | Type | Test Method |
| --- | --- | --- |
| (1) No observed migration of silicone additive | Required | Films were tested for 12 weeks (84 days), after which migration would be unlikely to occur. Additive migration of the slip additive was observed by measuring the COF values on the layer of the film that had no slip additive. If there was no migration, static and dynamic COF values were 1 or greater for the layer with no slip additive. If migration occurred, static and dynamic COF values decreased below 1. |
| (2) COF values lower than the nonreactive silicone control film | Required | Threshold dynamic COF value of 0.4 or less and a static COF value of 0.5 or less. |
| (3) Stability of the slip additive | Preferred | Less than a 5% change in static and dynamic COF values between the 1st day after manufacturing and: (i) 20 days after manufacturing, and (ii) thermal treatment at 60° C. for 7 days. |

The COF values were measured using the ASTM D1894 Standard Test Method for Static and Kinetic Coefficients of Friction of Plastic Film and Sheeting. Haze and clarity were measured according to ASTM D1003: Standard Test Method for Haze and Luminous Transmittance of Transparent Plastics using the BYK-GARDNER Haze Guard Plus.

TABLE 8

| | Example | | | | | |
| --- | --- | --- | --- | --- | --- | --- |
| | A | B | C | D | 1 | 2 |
| COF within 1 Day after Film Manufacturing (ASTM D1894) | | | | | | |
| Static COF | 0.56 | 0.35 | 0.45 | 0.62 | 0.39 | 0.35 |
| Dynamic COF | 0.46 | 0.27 | 0.39 | 0.57 | 0.35 | 0.29 |
| COF 20 Days after Film Manufacturing (ASTM D1894) | | | | | | |
| Static COF | 0.48 | 0.36 | 0.5 | 0.66 | 0.38 | 0.34 |
| Dynamic COF | 0.41 | 0.28 | 0.44 | 0.59 | 0.33 | 0.26 |
| Δ Static COF (COF Day 1/COF Day 20) | 0.08 | −0.01 | −0.05 | −0.04 | 0.01 | 0.01 |
| Δ Dynamic COF (COF Day 1/COF Day 20) | 0.05 | −0.01 | −0.05 | −0.02 | 0.02 | 0.03 |
| COF after thermal treatment at 60° C. for 7 days (ASTM D1894) | | | | | | |
| Static COF | 0.42 | 0.33 | — | 0.6 | 0.37 | 0.32 |
| Dynamic COF | 0.32 | 0.28 | — | 0.57 | 0.31 | 0.28 |
| Δ Static COF (COF Day 1/ COF at 60° C. for 7 days) | 0.14 | 0.02 | — | 0.02 | 0.02 | 0.03 |
| Δ Dynamic COF (COF Day 1/COF at 60° C. for 7 days) | 0.14 | −0.01 | — | 0 | 0.04 | 0.01 |
| Haze (ASTM D1003) | 15.7 | 10.9 | 10.3 | 24 | 12.6 | 20.4 |
| Clarity (ASTM D1003) | 83 | 85.1 | 90.6 | 62.5 | 77.8 | 70 |
| Additive migration to other film layer after 12 weeks (Yes/No) | Yes | Yes | Yes | No | No | No |
| Additive migration observed after day | 10 | 15 | 15 | >84 | >84 | >84 |
| Observations by microscope | No Gel | No Gel | No Gel | Gels formed (size = ~50 μm) | No Gel | No Gel |

The control film, Comparative Example A, contained the non-reactive silicone MB, which had a high molecular weight silicone gum as the slip additive. The polyethylene compound of Comparative Example A contained 1% silicone by weight. Comparative Example A exhibited moderate slip performance with static and dynamic COF values of 0.56 and 0.46 respectively, measured within the first day of manufacturing. Additive migration was observed within 10 days of manufacturing. Decreased COF values 20 days after manufacturing and after thermal treatment also evidenced migration of the non-reactive silicone in the control film.

Comparative Examples B-D, and Examples 1 and 2 each tested a reactive silicone as the slip additive, replacing the non-reactive silicone of Comparative Example A. For comparison with the control film, the polyethylene compounds of Comparative Examples B-D, and Examples 1 and 2, were formulated to contain 1% silicone by weight of the compound.

Masterbatches I and II tested ethoxy silyl terminated polydimethylsiloxane, also referred to as an alkoxysilane functionalized polysiloxane, as the slip additive. During production, the alkoxysilane functionalized polysiloxane hydrolyzed, producing silanol end groups on each chain. The silanol end groups then underwent a condensation reaction to create new Si—O bonds linking the polysiloxane to another polysiloxane, thereby forming a longer polysiloxane chain.

Functional polyolefin having a maleic anhydride (MAH) group was also added to Masterbatches I and II to catalyze the silanol hydrolysis and condensation reactions. In addition, a silanol catalyst was added to Masterbatch II to promote the hydrolysis and condensation reactions.

The resulting films of Masterbatches I and II, respectively Comparative Examples B and C, slowed the slip additive migration, but still evidenced additive migration after 15 days.

Masterbatch III tested methoxy functional methyl polysiloxane as a slip additive. The methoxy group offers a hydrolyzable methoxy silyl structure which undergoes a similar reaction as the hydrolysis and condensation reactions described for Masterbatches I and II. Masterbatch III also had a silanol catalyst to promote the hydrolysis and condensation reactions.

Additionally, Masterbatch III contained 3-aminopropyl trimethoxysilane, which reacted with the MAH group on the functionalized polyolefin to form a silane grafted polyethylene. Although Comparative Example D, produced from Masterbatch III, exhibited no migration of the slip additive after 84 days, gels of approximately ~50 μm in size formed in the film. These gels likely resulted from grafting of the amino-functionalized silane to the MAH-grafted polyolefin, which created co-polymers that were incompatible to the overall polyethylene matrix. As a result, the film had a rough surface that negatively affected slip performance, so Comparative Example D demonstrated significantly worse slip performance compared to the control film, Comparative Example A.

Masterbatch IV produced Example 1, which tested epoxy functionalized polysiloxane as a slip agent. Unexpectedly, Example 1 showed no migration of the slip additive after 12 weeks (84 days) and demonstrated improved static and dynamic COF values compared to the control film, Comparative Example A. The COF measured 20 days after manufacturing and after thermal treatment resulted in consistent values that evidenced good stability of the slip additive in the film. In addition, Example 1 showed excellent optical properties that were similar to the optical properties of the control film.

Finally, Masterbatch V produced Example 2, which tested a secondary amine functional polysiloxane as a slip additive. Example 2 also showed no migration of the slip additive after 84 days and demonstrated improved static and dynamic COF values compared to the control film, Comparative Example A. In addition, good slip additive stability was evidenced by consistent COF values measured 20 days after manufacturing and after thermal treatment.

Selection of the appropriate reactive silicone for different polyolefin-based compounds is difficult and unpredictable. Silicone's effectiveness as a non-migrating slip additive is affected by multiple variables, including the reactivity to, compatibility with, and surface energy of the reactive silicone relative to the polyolefin matrix.

Comparative Examples B and C demonstrated that although the hydrolysis and condensation reactions of the polysiloxane formed longer silica chains, which increased the density of the polysiloxane, it did not prevent the migration of the polysiloxane. Comparative Example D showed that, in addition to forming the longer silica chains, reacting the MAH group of the functionalized polyolefin with an amino-functionalized silane immobilized the polysiloxane. However, the side product of the reaction between the functionalized polyolefin and amino-functionalized silane was incompatible with the polyethylene matrix, and created gels that compromised the film's slip performance.

Examples 1 and 2 did not undergo any hydrolysis or condensation reactions. Instead, Examples 1 and 2 relied only on the reactivity of the epoxy group or secondary amine group of the polysiloxane with the functionalized polyolefin to create a linkage that, unexpectedly, immobilized the polysiloxane in the polyethylene matrix, while also achieving improved slip properties compared to the control film.

The invention is not limited to the above embodiments. The claims follow.

What is claimed is:

1. A masterbatch for polyethylene, comprising in weight percent of the masterbatch:
   (a) from 40 to 90 weight percent of polyethylene carrier,
   (b) from 5 to 10 weight percent of functionalized polysiloxane,
   (c) from 5 to 40 weight percent of functionalized polyolefin, and
   (d) optionally, from 0 to 1 weight percent of other additives;

wherein the functional group on the functionalized polysiloxane is an epoxy group or a secondary amine group, and wherein the functionalized polyolefin contains a maleic anhydride group and is a grafting agent for the functionalized polysiloxane.

2. The masterbatch of claim 1, wherein the functionalized polyolefin is ethylene ethyl acrylate maleic anhydride terpolymer.

3. A polyethylene compound comprising the masterbatch of claim 1 and polyethylene resin.

4. A polyethylene compound comprising:
   (a) polyethylene matrix and
   (b) slip additive comprising in weight percent of the slip additive
      (i) from 40 to 90 weight percent of polyethylene carrier,
      (ii) from 5 to 10 weight percent of functionalized polysiloxane,
      (ii) from 5 to 40 weight percent of functionalized polyolefin, and
      (iv) optionally, from 0 to 1 weight percent of other additives;

wherein the functional group on the functionalized polysiloxane is an epoxy group or a secondary amine group, and wherein the functionalized polyolefin contains a maleic anhydride group and is a grafting agent for the functionalized polysiloxane.

5. The polyethylene compound of claim 4, wherein the functionalized polyolefin is miscible with the polyethylene matrix.

6. The polyethylene compound of claim 4, wherein the additive is selected from the group consisting of anti-blocking agents; adhesion promoters; biocides (antibacterials, fungicides, and mildewcides), anti-fogging agents; anti-static agents; bonding, blowing and foaming agents; dispersants; fillers and extenders; fire and flame retardants and smoke suppresants; impact modifiers; initiators; lubricants; micas; pigments, colorants and dyes; plasticizers; processing aids; other slip or release agents; silanes, titanates and zirconates; stabilizers; stearates; ultraviolet light absorbers; viscosity regulators; waxes; and combinations of them.

7. The polyethylene compound of claim 4, wherein one or more additives are added in the form of a masterbatch concentrate.

8. The polyethylene compound of claim 4, in the shape of a molded plastic article, an extruded plastic article, or a calendered plastic article.

9. A film having at least one layer comprised of the polyethylene compound of claim 4.

10. A laminate of the film of claim 9, wherein there is more than one film layer, and wherein each layer comprises same or different ingredients.

11. The laminate of claim 10, wherein there is a skin layer contacting one surface of a core layer also having an opposing surface, and wherein the skin layer has a thickness between about 0.5 microns and about 1 millimeter.

12. The laminate of claim 11, further comprising a second skin layer contacting the opposing surface of the core layer, wherein the core layer comprises polyolefin resin.

13. The laminate of claim 11, wherein the skin layer has dynamic coefficient of friction value of 0.4 or less and static coefficient of friction value of 0.5 or less, according to the ASTM D1894-01 method, within 1 day after manufacturing of the laminate.

14. The laminate of claim 11, wherein the change between static coefficient of friction and dynamic coefficient of friction values of the skin layer within 1 day after manufacturing and 20 days after manufacturing, according to the ASTM D1894-01 method, is 5% or less.

15. The laminate of claim 11, wherein there is essentially no migration of the slip additive from the skin layer into another film layer measured 12 weeks after manufacturing.

* * * * *